(12) United States Patent
Corbin et al.

(10) Patent No.: US 8,650,155 B2
(45) Date of Patent: Feb. 11, 2014

(54) APPARATUS AND METHOD FOR LOG BASED REPLICATION OF DISTRIBUTED TRANSACTIONS USING GLOBALLY ACKNOWLEDGED COMMITS

(75) Inventors: Scott Roger Corbin, Spooner, WI (US); Joel Shepherd, Golden, CO (US); Alok Pareek, Brisbane, CA (US); Chris McAllister, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 722 days.

(21) Appl. No.: 12/037,761

(22) Filed: Feb. 26, 2008

(65) Prior Publication Data

US 2009/0217274 A1 Aug. 27, 2009

(51) Int. Cl.
*G06F 7/00* (2006.01)
(52) U.S. Cl.
USPC ............ 707/615; 707/635; 707/674; 707/702
(58) Field of Classification Search
None
See application file for complete search history.

(56) References Cited

U.S. PATENT DOCUMENTS

| 5,745,753 A * | 4/1998 | Mosher, Jr. ............... 707/610 |
|---|---|---|
| 5,781,910 A * | 7/1998 | Gostanian et al. ............ 707/610 |
| 6,122,630 A * | 9/2000 | Strickler et al. ............... 1/1 |
| 6,247,023 B1 * | 6/2001 | Hsiao et al. ............... 1/1 |
| 6,785,696 B2 | 8/2004 | Mosher, Jr. et al. |
| 7,103,597 B2 * | 9/2006 | McGoveran ............... 1/1 |
| 7,206,805 B1 * | 4/2007 | McLaughlin, Jr. ............ 709/203 |
| 7,290,056 B1 * | 10/2007 | McLaughlin, Jr. ............ 709/230 |
| 2004/0111390 A1 | 6/2004 | Saito et al. |
| 2005/0021567 A1 | 1/2005 | Holenstein et al. |
| 2005/0289189 A1 | 12/2005 | Nettleton et al. |
| 2006/0212496 A1 | 9/2006 | Romine et al. |
| 2007/0220059 A1 | 9/2007 | Lu et al. |
| 2007/0226277 A1 | 9/2007 | Holenstein et al. |
| 2007/0288555 A1 | 12/2007 | Felt et al. |

FOREIGN PATENT DOCUMENTS

WO PCT/US09/31196 3/2009

OTHER PUBLICATIONS

Nauckhoff (WO 94/20903).*

* cited by examiner

*Primary Examiner* — Hosain Alam
*Assistant Examiner* — Bruce Witzenburg
(74) *Attorney, Agent, or Firm* — Kilpatrick Townsend & Stockton LLP

(57) ABSTRACT

A computer readable storage medium includes executable instructions to read source node transaction logs to capture transaction data, including local transaction data, global transaction identifiers and participating node data. The global transaction identifiers and participating node data are stored in target node queues. The target node queues are accessed to form global transaction data. Target tables are constructed based upon the local transaction data and the global transaction data.

20 Claims, 2 Drawing Sheets

APPARATUS AND METHOD FOR LOG BASED REPLICATION OF DISTRIBUTED TRANSACTIONS USING GLOBALLY ACKNOWLEDGED COMMITS

FIELD OF THE INVENTION

This invention relates generally to the replication of data in a networked environment. More particularly, this invention relates to log based replication of distributed transactions using globally acknowledged commits.

BACKGROUND OF THE INVENTION

In a distributed database system, operations associated with a transaction can be submitted at multiple nodes or sites. The transaction is an atomic unit of work that is either fully submitted or entirely rolled back in the database for recovery and consistency reasons. Most transactional managers within a distributed database system implement some variation of a two-phase commit protocol. A two-phase commit protocol is a distributed algorithm that specifies when all nodes in a distributed system agree to commit a transaction. The protocol results in either all nodes committing the transaction or aborting, even in the case of network failures or node failures. The two phases of the algorithm are the commit-request phase, in which the coordinator attempts to prepare all the cohorts, and the commit phase, in which the coordinator completes the transactions. Each participating node in this scheme writes its local changes to its own transaction log and records a subsequent commit/abort record sent by the transaction manager to its transaction log.

In a log based replication scheme where distributed transactions between a source system and a target system are being asynchronously replicated for eventual failover in case of a disaster, a site/network/process failure may prevent successful propagation of changes from each participating source site that was involved in the distributed transaction to the target system. For efficiency reasons, the replication process at the target system may decide to commit changes arriving from each source site independently (i.e., as a non-distributed transaction), instead of reassembling the local work from each source site and submitting that as a distributed transaction using a two-phase commit protocol. In case of a failover to the target system, transactional consistency semantics require that the target database not reflect any partial distributed transactions. Therefore, replication must ensure receipt of all local units of work from each site that fully reflect the source side distributed transaction prior to submitting each local unit of work as a non distributed transaction. Alternately, replication must back out partially applied portions of a distributed transaction. In the absence of such methods, partial changes from one or additional (but not all) sites may be reflected in the target database system thereby breaking transactional consistency.

It would be desirable to provide improved techniques for log based replication of distributed transactions.

SUMMARY OF THE INVENTION

The invention includes a computer readable storage medium with executable instructions to read source node transaction logs to capture transaction data, including local transaction data, global transaction identifiers and participating node data. The global transaction identifiers and participating node data are stored in target node queues. The target node queues are accessed to form global transaction data. Target tables are constructed based upon the local transaction data and the global transaction data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
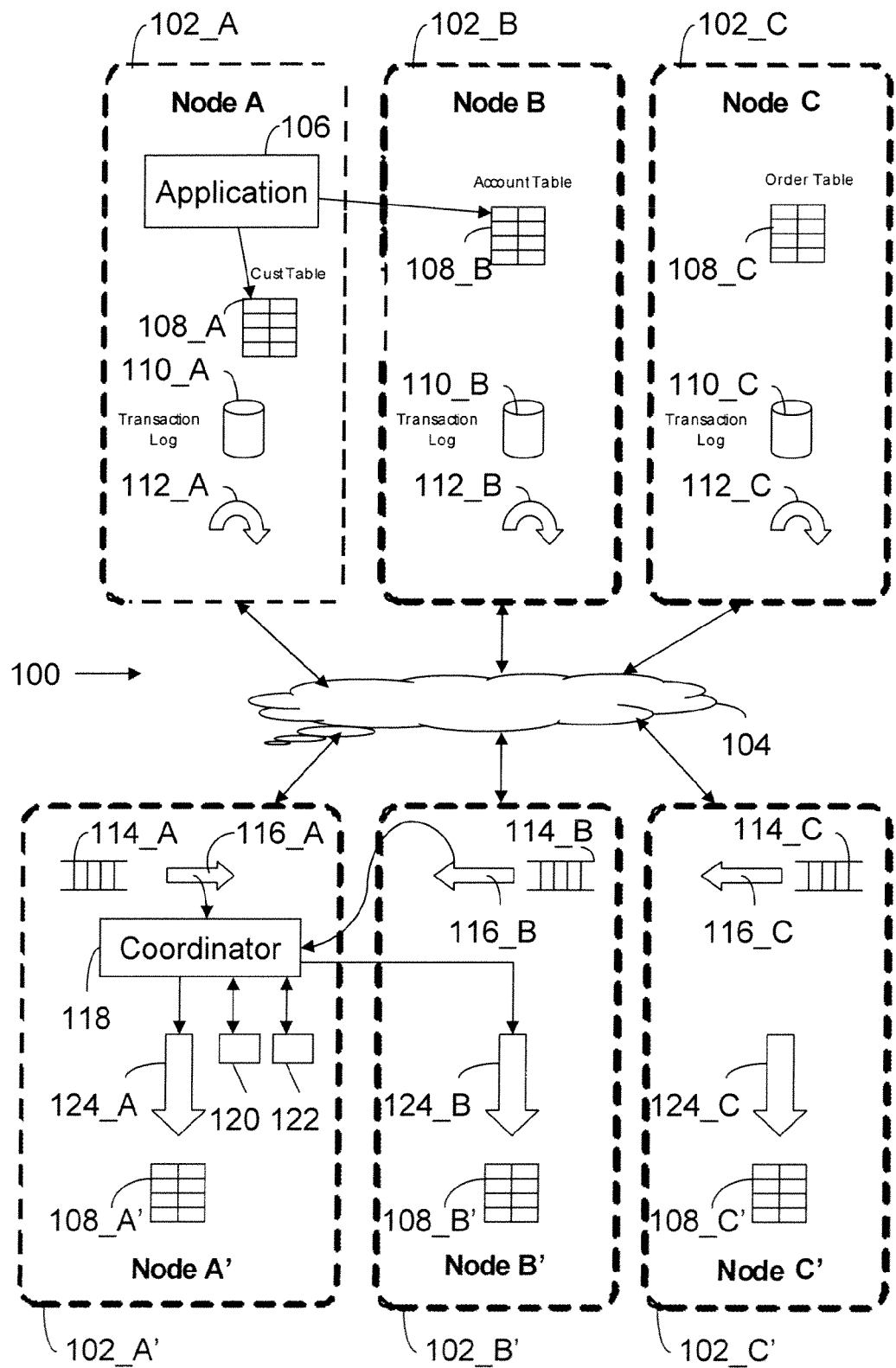
FIG. 1 illustrates a system constructed in accordance with an embodiment of the invention.

The invention is disclosed in the context of the following defined terms.

A distributed database is a collection of databases that are logically interrelated. These databases are typically distributed over a computer network. Transactions submitted in the database are generally a combination of distributed transactions that span multiple databases or non-distributed transactions that only modify the local database.

A distributed database management system is the software that manages the distributed database and provides a user interface.

A transaction is a unit of work that adheres to ACID (atomicity, consistency, isolation, and durability) properties. A transaction typically modifies resources. A distributed transaction is the collective work done by individual resources (databases), typically distributed over a network. A transaction manager is responsible for managing a global transaction across all resources while maintaining ACID properties. In other words, a distributed transaction updates multiple disparate resources within the same logical unit of work. *Distributed Transaction Processing—Reference Mode, Version 3*, published by The Open Group, defines the X/Open Distributed Transaction Processing (DTP) model. This model defines five basic components: an application program (AP), resource managers (RM), a transaction manager (TM), communication resource managers (CRMs), and a communication protocol. The AP defines the transaction boundaries, while the TM initiates and coordinates the transaction across the participating RMs. Typically, an RM is a database or file access method responsible for carrying out the work issued to it by the AP. The terms global transaction and distributed transaction are used interchangeably.

A non-global transaction is an autonomous unit of work carried out by an individual resource that is not participating in a global transaction. Commit of a non-global transaction does not require a two-phase commit protocol across multiple nodes or sites.

A local transaction defines the unit of work carried out by an individual resource participating in a global transaction. This should not be confused with a non-global or non-distributed transaction. Commit of each local transaction is requested by the transaction manager in accordance with a two-phase commit protocol once all participants have successfully prepared for commit.

Application of a partially applied distributed transaction reflects a state of a distributed database where one or more, but not all local transactions that comprise a distributed transaction have been committed to the database.

Most relational database implementations use logging techniques that store before and after images of changed data and flush these changes into a transaction log that sits in non-volatile storage (e.g., disk storage). There are many useful reasons to maintain a transaction log, but the fundamental uses are to support transactional, crash, and data recovery. The database transaction log captures modifications made to the data pages (that belong to database tables) as transaction log records that represent atomic state transitions within the database. Each transaction log record is an atomic change that plays a critical part in satisfying the fundamental properties (ACID) that guarantee persistence (durability) of committed transactions in the database.

The transaction log is usually implemented as a file, or series of files, and represents an archive of all the transactions that were submitted to the database. For some databases, once an online log file is full, logging moves to the next file in sequence. The previous log file usually gets archived for recovery purposes. Each log file has a unique log sequence number (LSN) associated with it. For other databases, the transaction log is circular and pages are archived and reused as those pages are required for additional logging.

One transaction can generate multiple change data records; each change data record is generated with a unique change or ordering or sequence number that helps maintain ordering between changes made by multiple transactions. In a distributed database, each node is responsible for managing its local transaction. The transaction manager is responsible for the global (distributed) transaction across individual resources (databases). The important properties of transaction log records that are relevant to the disclosed technology are:

1. A unique transaction identifier (TXID) for the local unit of work.
2. A unique global transaction identifier (GTXID) for the global unit of work.
3. The number of participating nodes in a global transaction.
4. A list of unique identifiers for each node participating in a global transaction.

In most cases these properties are maintained and recorded by the global transaction manager or coordinator. However, it is also possible to provide this information for two independent databases. In this scenario, the application takes responsibility for the generation of the relevant global transaction properties and ensures that change records are written to the transaction log to include the above properties for each local transaction. A change record may be generated within the transaction log by performing an insert or update into a special table referred to as a "marker" table within the local database. The changes made to the marker tables get reflected in the transaction log, and can be used to retrieve the global transaction properties.

One embodiment of the invention includes an efficient replication scheme that is based on acknowledgements of local portions of work from each source site at the target site to guarantee that a failover never results in partially applied distributed transactions. No partial backout or rollback of transactions is needed.

The invention is relevant in the area of log based replication of a distributed transaction in an environment between a source side database that has two or more participating nodes (e.g., a shared disk clustered database or a shared nothing partitioned database and a target database that also has two or more nodes). The invention is also applicable to log based replication of a distributed transaction in an environment where the source side spans multiple independent databases, and the target side spans one or multiple independent databases, or one or multiple nodes of a single database.

An embodiment of the invention provides a method for coordinating distributed transactions in an efficient manner within a replication environment, such that a distributed target system maintains global read-consistency after a failover, when replication is stopped, or when appropriate locks are acquired to prevent reads of partially applied distributed transactions. This is accomplished by coordinating local transactions based on their global transaction identifier (GTXID) and participating node information (PNI).

Local transactions are only applied to the target nodes when all participating nodes have received their complete local unit of work. This "delayed apply" strategy provides transaction integrity across the distributed database management system in the event of a failover. It is assumed that all pending local transactions are flushed/committed into the target prior to failover. In an active replication scenario, where a live application is reading from the target, a two-phase commit protocol must be used to ensure that each local transaction has acquired the necessary locks within the database before allowing any local transaction to commit.

The previously described X/Open Distributed Transaction Protocol (DTP) defines the components of a distributed system. The application program (AP) defines the global transaction boundaries and the work to be done by each resource manager (RM). The transaction manager (TM) manages the global transaction. The RMs issue changes to the resource (typically a database) and are responsible for the local transactions.

Generally, a distributed transaction is managed by the distributed DBMS. The TM and RMs are incorporated within the same distributed DBMS. Information such as the global transaction identifier (GTXID) and participating nodes (RMs) are included in the transaction log owned by each node (RM).

It is also possible that independent databases, managing their own distinct transaction logs share a TM. The TM is a logical component and could actually be embedded within the AP. In this scenario, it may be possible that the GTXID, and information about participating RMs, are not included implicitly in the transaction logs owned by each RM. The TM (or AP) may be modified to explicitly include the GTXID and PNI. It is up to the TM (or AP) to determine an appropriate GTXID and be able to uniquely identify each of the participating nodes. One means of including this information in the transaction log is to update a "marker" resource (e.g., a table in a database) with the pertinent information within the local transaction for each participating RM.

In sum, this method can be used for all distributed database configurations, where a GTXID and PNI are available within the transaction log for each RM. For those databases where a GTXID and PNI are not readily available, a "marker" resource strategy can be used to provide this information within the transaction log, where it is directly associated with each local transaction.

GoldenGate Software, Inc. of San Francisco, Calif. sells a transactional data management (TDM) platform that allows transactions (and thereby data) to be replicated across heterogeneous as well as homogeneous systems. The TDM allows one to replicate data across different database systems, as well as different machine architectures to provide Log Based Replication (LBR). The replication is done asynchronously by reading a source database's transaction logs and propagating the captured transactions to a target database. The flow of LBR is as follows:

1. An application starts a new transaction.
2. The transaction generates change data and transaction control records.

3. The database log manager or another process writes the change data and transaction control records to the transaction log.
4. A capture process reads the transaction log and extracts the transaction's operations.
5. The capture process maintains a queue of all the transaction operations.
6. Once the transaction commits, the changes are shipped to a commit-ordered output queue (persistent storage). The output generally resides on the target system.
7. A delivery process on the target system reads the output queue and replays the changes at that database Transactional log based replication is therefore a data replication method accomplished by translating the change data and transaction control records from the transaction log into transactions that subsequently get executed at the target database.

To support transactional consistency in a distributed system, a coordination operation is required between operations 6 and 7. A target side coordinator ensures that no delivery process replays changes at a local database until all nodes participating in a global transaction have acknowledged receipt of their complete local unit of work. There are four major components used to support replication of distributed transactions: an LBR capture process, an LBR coordination process, an LBR reader process and an LB delivery process.

The LBR capture process is the machine process that reads the source database's transaction logs and captures the local transactional changes into commit-ordered queues. The LBR coordination process is the machine process that coordinates global transactions and determines when a delivery process can apply changes to the target database. The LBR reader process is a machine process that acts as a proxy for the coordination process to read from the queues on each target node to gather information about global transactions. The LBR delivery process is the machine process that reads from the commit-ordered queues and applies the changes at the target database that were captured by the LBR capture process.

The foregoing processes are more fully appreciated by referring to FIG. 1. FIG. 1 illustrates a system 100 that includes a first set of nodes 102_A, 102_B and 102_C, which are replicated as nodes 102_A', 102_B' and 102_C' via network 104. Each node may be a separate machine, such as a server. In this example, node 102_A runs an application or application program (AP) 106, which generates changes that are recorded in tables 108_A, (Cust Table), 108_B (Account Table) and 108_C (Order Table). In addition, the changes are recorded in local transaction logs 110_A, 110_B and 111_C owned by an individual resource manager RM (e.g., database). Capture processes 112_A, 112_B and 112_C are used on each source node to capture change data recorded in respective transaction logs 110_A, 110_B and 110_C. The capture process groups all records within a local transaction using a unique transaction identifier (TXID), which is represented in the transaction log. Multiple capture processes may be used on each node for scalability. For each transaction, the capture process also captures context information for the transaction that will be used by the coordinator to group and coordinate distributed transactions. This context information minimally contains the GTXID and PNI, which are required for coordination. Additional context information such as commit timestamp, logical sequence number (LSN) of the commit, LSN of the start of the transaction, number of records in the transaction, and originating node identifier may be included for auditing purposes.

Once a transaction commits, all change data records for the transaction are written to a persistent queue. In particular, the change data records are passed over the network 104 to a queue 114. FIG. 1 illustrates queues 114_A. 114_B and 114_C.

A coordinator process (CP) 118 is used in a "delayed apply" strategy, such that no delivery process will propagate changes to the target database until the entire global transaction is completely acknowledged across the local queues. A CP can reside on any of the target nodes or even a separate node in the network. In this example, the coordinator 118 is shown on node 102_A'. The CP is responsible for collecting and tracking global transaction information received from the various reader processes.

The reader process (RP) 116 acts as a proxy for the CP to read the persistent, commit-ordered queues generated by the capture process across all target nodes. These queues generally reside on the complementary target node or attached storage. Thus, as shown in FIG. 1, reader processes 116_A, 116_B and 116_C are respectively associated with queues 114_A, 114_B and 114_C.

The RPs scan their local queue for transactions where more than one node participated as part of a global transaction. When it finds one, it stores the starting position of that transaction within the queue. When the RP has read the complete transaction, then the global transaction identifier (GTXID) is added to the RP's reply buffer.

When the reply buffer becomes full, or when a timeout occurs, the buffer is flushed and the information is sent back to the CP 118. In one embodiment, the reply to the CP includes: (1) a unique queue identifier, (2) a unique queue position representing the start of the global transaction, (3) a GTXID (global transaction identifier), (4) a parent node number, and (5) participating node information (PNI). If the RP is only processing non-global transactions, then it must still periodically respond to the CP with its read position. This can be controlled by a timer or by using a threshold for the maximum number of non-global transactions that can be processed before an RP must respond with its current read position. The RP must also respond periodically when waiting on an empty queue or end of file.

The CP stores transaction information in a transaction table. This transaction table is persisted for recovery from outages. A memory mapped file may be used for efficiency. The CP also maintains a checkpoint for each RP's read position. For example, a table 120 may be used to store checkpoint information. The checkpointed read position of the RPs is kept in sync with a persisted transaction table 122. The CP forces dirty pages to the transaction table 122 to be faulted out prior to writing a checkpoint. Upon recovery, the CP reloads the transaction table 122 and resumes reading (via RPs) based on the checkpoint positions recorded for each of the RPs.

The CP uses the transaction information it receives from all RPs to track the local transactions represented across all target nodes. It uses this transaction information to determine when a global transaction is represented completely across all participating nodes, based on the PNI. When the complete local transaction for each participating node (PN) has been persisted within the local queues, then the CP determines that the global transaction can be processed (i.e., applied) by the individual delivery processes 124_A, 124_B and 124_C. As a result, the original tables are reconstructed. The reconstructed tables are indicated by tables 108_A', 108_B' and 108_C' of FIG. 1.

Note that the protocol defined above, which does not use a two-phase commit, is used for efficiency. The target is guaranteed to exhibit global read consistency (across all target nodes) as long as the delivery processes have applied all change data for transactions that have been acknowledged by the CP. This is a viable solution for active-passive failover, or any scenario where the target application is not exposed to minor inconsistencies between local nodes for global transactions that are being currently applied.

This protocol can also be modified slightly to guarantee that no local node commits its portion of a global transaction until each local node has successfully applied all data for its own local transaction. This two-phase commit protocol between the coordinator and the delivery process ensures that the resource manager (database) holds locks across all target nodes prior to any local commits to guarantee consistency for a live application. If the application accesses data that has been modified by the global transaction, then it must wait on the pending locks and will have a read-consistent view of the data. This is a viable solution for active target systems.

A delivery process is used to propagate change data from the commit-ordered queue on the target into the local target node. Multiple delivery processes may reside on the same target node. For scalability, each delivery process may be assigned a set of data for the same queue. This assignment can be done by table name, key ranges, or based on logical data partitions.

Each delivery process is associated with a CP during configuration. When a delivery process reads from the queue it must first determine if a transaction is autonomous to its target node (non-global) or if it is part of a global transaction. If the transaction is non-global, then the delivery process can apply the transaction to the target. If the transaction is part of a global transaction, then the delivery process must send a request to the CP to acknowledge whether the delivery process may process the transaction. The CP uses its knowledge of global transactions across all nodes to determine if the delivery process can apply the change data for the local transaction.

If the queue on each node participating in the global transaction contains a complete local transaction, then the transaction is safe to process and the CP sends an "ack" to the delivery process. Otherwise, a "nak" is sent, and the delivery process delays for a specified period of time and subsequently queries the CP. After a configurable number of retries have been "nak'd", the delivery process may output a warning message.

When a delivery process makes a request to the CP, the CP may have already assimilated information about transactions within the source queue that the delivery process has not yet read. To reduce traffic, the CP may respond with an "ack" for the pending transaction request plus the unique position within the queue representing the high-water mark for "acknowledged" transactions. The delivery process can safely apply all changes up to the high-water mark before making another request to the CP.

If a delivery process terminates, it is possible that it may make a duplicate request to the CP. If the delivery process makes a request for a GTXID with a queue position and time prior to the oldest known transaction in the CP (based on associated queue position), then the CP indicates that it is safe to process the transaction.

The delivery process may group local transactions into a single transaction (with a single commit) for efficiencies. If the delivery process has an outstanding "grouped" transaction and is waiting for a period of time for an "ack" on a global transaction, then the delivery process should commit the "grouped" transaction to eliminate any contention (locks) in the target while waiting for the global transaction to be acknowledged by the CP.

An embodiment of the invention may be characterized as follows.

A global transaction identifier G represents the unit of work across all participating nodes.

A local transaction T represents the local unit of work for a single node participating in a global transaction identified as G.

A list L represents the list of uniquely identified participating nodes within global transaction G.

A persistent commit-ordered transaction queue Q.

A unique position P within transaction queue Q.

A transaction table TT manages the pending global transactions during coordination.

A checkpoint C supports recovery of the coordination process.

Based upon the foregoing, an embodiment of the invention can be characterized as follows.

1. For independent databases participating in a distributed transaction, G and L may not be implicitly represented in their individual transaction logs.
   1.1 In this scenario, the application or transaction manager (possibly within the application) may be modified to force this information into the transaction logs by updating a "marker" table as part of each local transaction T.
   1.2 The "marker" record minimally contains G and L within the scope of each local transaction T.
2. For each source node
   2.1 Read the associated transaction log and capture a complete local transaction T.
   2.2 If T is a participant in a global transaction
      2.2.1 Record the associated global transaction identifier G.
      2.2.2 Record the list of uniquely identified participating nodes L.
   2.3 Once T has been committed, write the contents of T, along with G and L, to the persistent commit-ordered queue Q.
3. For each target node
   3.1 The delivery process reads from its local queue Q.
   3.2 Any non-global transactions are applied and committed.
   3.3 Any local transactions T are processed once acknowledged by the coordination process.
   3.4 Any pending local transactions T are committed if waiting for acknowledgement for a globally distributed transaction for a specified period of time.
4. The coordinator reads from Q on each local node.
   4.1 A reader process may be used to read remotely over the network.
5. The coordinator assembles information associated with global transaction G from all target queues and stores it in TT.
6. Once all participating nodes in L are represented across all target queues, then it is safe to acknowledge processing of G for requesting delivery processes. Until that time, all requests receive a negative acknowledgment.
7. The coordinator periodically persists the information in TT and writes checkpoint C, including each position P for each Q.

Figure 2:
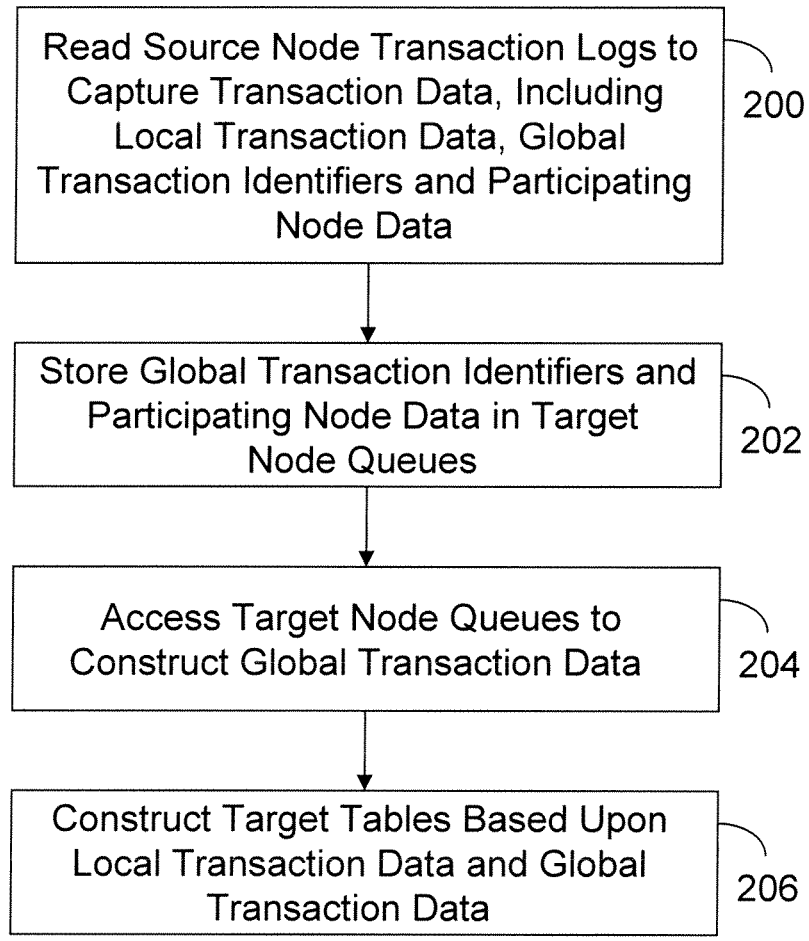
FIG. 2 illustrates processing operations associated with an embodiment of the invention.

The foregoing operations are summarized in the process flow of FIG. 2. Source node transaction logs are read to capture transaction data, including local transaction data, global transaction identifiers and participating node data 200. The global transaction identifiers and participating node data are stored in target node queues 202. The target node queues are then accessed construct global transaction data 204. Target tables are constructed based upon the local transaction data and global transaction data 206.

Those skilled in the art will recognize a number of advantages associated with the disclosed technology. First, it provides transactional read-consistency of data across distributed databases in a replication environment after a failover. It provides transactional read-consistency of data across distributed databases in a replication environment when replication at the target side is stopped normally. It relaxes the requirement of two-phase commits to provide transactional read-consistency with minimal overhead and maximum throughput for passive targets. It allows for a two-phase commit protocol between the coordinator and delivery processes to maintain transactional read consistency when a "live" application is reading data from an active target. It allows a distributed coordination process to reside on any node in the network to reduce overhead or resource contention on source and target systems as necessary. Aborts or rollbacks are not required to achieve consistency on the target system. A vendor-provided "marker" resource can be used to include a global transaction identifier and participating node information into each local transaction log on the source to support global transactions across independent databases. In addition, transactions can be coordinated across independent database management systems that are not part of a single distributed database management system. It allows for applying data into target databases that don't support distributed transaction semantics. Coordination state is recoverable to endure outages.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of analyzing distributed transactions performed on a primary database system and replicating the distributed transactions on a secondary database system, the method comprising:
   at the primary database system:
      performing a global transaction on the primary database system, wherein:
         the primary database system comprises a first plurality of nodes;
         each of the first plurality of nodes comprises a transaction log; and
         the global transaction comprises a plurality of local transactions performed on a subset of the first plurality of nodes;
      storing records of the local transactions in the transaction logs, wherein the records comprise:
         a global transaction identifier; and
         a list of nodes involved in the global transaction; and
      sending the records of the local transactions from the transaction logs over a network to the secondary database system; and
   at the secondary database system:
      storing the records of the local transactions, wherein:
         the secondary database system comprises a second plurality of nodes;
         each of the second plurality of nodes comprises a commit-ordered transaction queue; and
         the records of the local transactions are stored in the commit-ordered transaction queues of nodes in the secondary database system that correspond to nodes in the primary database system;
      waiting until the global transaction is completely represented in the commit-ordered transaction queues by monitoring the global transaction identifier and the list of nodes involved in the global transaction; and
      performing, after the global transaction is completely represented in the commit-ordered transaction queues, the plurality of local transactions on corresponding nodes in the second plurality of nodes in the secondary database system, such that data affected by the global transaction in the secondary database system matches corresponding data affected by the global transaction in the primary database system.

2. The method claim 1, wherein a process coordinator that is shared by the second plurality of nodes in the secondary database system determines when the global transaction is completely represented in the commit-ordered transaction queues.

3. The method of claim 2, wherein the process coordinator utilizes a two-phase commit protocol to determine when the global transaction is completely represented in the commit-ordered transaction queues.

4. The of claim 1, wherein each of the first plurality of nodes comprises a resource manager and a database table.

5. The method of claim 1, wherein a one-to-one relationship exists between the first plurality of nodes and the second plurality of nodes.

6. The method of claim 1, wherein the commit-ordered transaction queues additionally store non-global transactions performed on individual nodes in the primary database system.

7. The method of claim 1, wherein the commit-ordered transaction queues are scanned by the secondary database system, and a starting position of each of the records of the local transactions is recorded.

8. A non-transitory computer-readable memory comprising a sequence of instructions which, when executed by one or more processors, causes the one or more processors to analyze distributed transactions performed on a primary database system and replicate the distributed transactions on a secondary database system by:
at the primary database system:
performing a global transaction on the primary database system, wherein:
the primary database system comprises a first plurality of nodes;
each of the first plurality of nodes comprises a transaction log; and
the global transaction comprises a plurality of local transactions performed on a subset of the first plurality of nodes;
storing records of the local transactions in the transaction logs, wherein the records comprise:
a global transaction identifier; and
a list of nodes involved in the global transaction; and
sending the records of the local transactions from the transaction logs over a network to the secondary database system; and
at the secondary database system:
storing the records of the local transactions, wherein:
the secondary database system comprises a second plurality of nodes;
each of the second plurality of nodes comprises a commit-ordered transaction queue; and
the records of the local transactions are stored in the commit-ordered transaction queues of nodes in the secondary database system that correspond to nodes in the primary database system;
waiting until the global transaction is completely represented in the commit-ordered transaction queues by monitoring the global transaction identifier and the list of nodes involved in the global transaction; and
performing, after the global transaction is completely represented in the commit-ordered transaction queues, the plurality of local transactions on corresponding nodes in the second plurality of nodes in the secondary database system, such that data affected by the global transaction in the secondary database system matches corresponding data affected by the global transaction in the primary database system.

9. The non-transitory computer-readable memory according to claim 8 wherein a process coordinator that is shared by the second plurality of nodes in the secondary database system determines when the global transaction is completely represented in the commit-ordered transaction queues.

10. The non-transitory computer-readable memory according to claim 9 wherein the process coordinator utilizes a two-phase commit protocol to determine when the global transaction is completely represented in the commit-ordered transaction queues.

11. The non-transitory computer-readable memory according to claim 8 wherein each of the first plurality of nodes comprises a resource manager and a database table.

12. The non-transitory computer-readable memory according to claim 8 wherein a one-to-one relationship exists between the first plurality of nodes and the second plurality of nodes.

13. The non-transitory computer-readable memory according to claim 8 wherein the commit-ordered transaction queues additionally store non-global transactions performed on individual nodes in the primary database system.

14. The non-transitory computer-readable memory according to claim 8 wherein the commit-ordered transaction queues are scanned by the secondary database system, and a starting position of each of the records of the local transactions is recorded.

15. A system comprising:
one or more processors; and
a memory communicatively coupled with and readable by the one or more processors and comprising a sequence of instructions which, when executed by the one or more processors, cause the one or more processors to analyze distributed transactions performed on a primary database system and replicate the distributed transactions on a secondary database system by:
at the primary database system:
performing a global transaction on the primary database system, wherein:
the primary database system comprises a first plurality of nodes;
each of the first plurality of nodes comprises a transaction log; and
the global transaction comprises a plurality of local transactions performed on a subset of the first plurality of nodes;
storing records of the local transactions in the transaction logs, wherein the records comprise:
a global transaction identifier; and
a list of nodes involved in the global transaction; and
sending the records of the local transactions from the transaction logs over a network to the secondary database system; and
at the secondary database system:
storing the records of the local transactions, wherein:
the secondary database system comprises a second plurality of nodes;
each of the second plurality of nodes comprises a commit-ordered transaction queue; and
the records of the local transactions are stored in the commit-ordered transaction queues of nodes in the secondary database system that correspond to nodes in the primary database system;
waiting until the global transaction is completely represented in the commit-ordered transaction queues by monitoring the global transaction identifier and the list of nodes involved in the global transaction; and
performing, after the global transaction is completely represented in the commit-ordered transaction queues, the plurality of local transactions on corresponding nodes in the second plurality of nodes in the secondary database system, such that data affected by the global transaction in the secondary database system matches corresponding data affected by the global transaction in the primary database system.

16. The system of claim 15 wherein a process coordinator that is shared by the second plurality of nodes in the secondary database system determines when the global transaction is completely represented in the commit-ordered transaction queues.

17. The system of claim 16 wherein the process coordinator utilizes a two-phase commit protocol to determine when the global transaction is completely represented in the commit-ordered transaction queues.

18. The system of claim 15 wherein each of the first plurality of nodes comprises a resource manager and a database table.

19. The system of claim 15 wherein a one-to-one relationship exists between the first plurality of nodes and the second plurality of nodes.

20. The system of claim 15 wherein the commit-ordered transaction queues additionally store non-global transactions performed on individual nodes in the primary database system.

\* \* \* \* \*

UNITED STATES PATENT AND TRADEMARK OFFICE
CERTIFICATE OF CORRECTION

| | | |
|---|---|---|
| PATENT NO. | : 8,650,155 B2 | |
| APPLICATION NO. | : 12/037761 | |
| DATED | : February 11, 2014 | |
| INVENTOR(S) | : Corbin et al. | |

It is certified that error appears in the above-identified patent and that said Letters Patent is hereby corrected as shown below:

In the Specification:

In column 5, line 12, delete "database" and insert -- database. --, therefor.

In column 5, line 50, delete "111_C" and insert -- 110_C --, therefor.

In column 6, line 4, delete "114_A." and insert -- 114_A, --, therefor.

In the Claims:

In column 10, line 46, in Claim 2, delete "method claim" and insert -- method of claim --, therefor.

In column 10, line 55, in Claim 4, delete "The of" and insert -- The method of --, therefor.

Signed and Sealed this
Twenty-fourth Day of June, 2014

Michelle K. Lee
*Deputy Director of the United States Patent and Trademark Office*